United States Patent [19]

Alamaro

[11] 4,287,040
[45] Sep. 1, 1981

[54] PRODUCTION OF NITRIC OXIDES

[75] Inventor: Moshe Alamaro, Hod-Hasharon, Israel

[73] Assignee: G.D. Societa per Azioni, Bologna, Italy

[21] Appl. No.: 144,042

[22] Filed: Apr. 28, 1980

[30] Foreign Application Priority Data

May 8, 1979 [IL] Israel ........................................ 57239

[51] Int. Cl.³ ........................ C01B 21/30; C01B 21/32
[52] U.S. Cl. .................................... 204/179; 250/542; 423/405
[58] Field of Search ................ 423/400, 405; 204/179; 71/50, 58; 250/542, 543

[56] References Cited

U.S. PATENT DOCUMENTS

| | | | |
|---|---|---|---|
| 1,481,907 | 1/1924 | Jensen ................................... | 204/179 |
| 1,547,714 | 1/1925 | Andriessens .......................... | 423/405 |
| 3,149,915 | 9/1964 | Thomsen ............................... | 423/405 |
| 4,141,715 | 2/1979 | Wyse et al. ............................ | 71/58 |

FOREIGN PATENT DOCUMENTS

| | | | |
|---|---|---|---|
| 504775 | 7/1920 | France ..................................... | 423/400 |
| 196269 | 3/1923 | United Kingdom ..................... | 204/179 |

*Primary Examiner*—G. O. Peters
*Attorney, Agent, or Firm*—Browdy and Neimark

[57] ABSTRACT

The invention relates to a process for the production of nitric oxides, which can be used for the production of nitric acid and for the production of fertilizers based on these, which process for the production of nitric oxides comprises establishing an electrical discharge, passing through the discharge a mixture comprising air and nitric oxide as seeding material, and recovering the produced nitric oxides. The invention further relates to a mobile and easily transportable system for effecting such process, which comprises at least one discharge device, means for supplying air to said discharge, means for supplying electricity and means for introducing nitric oxide as seeding material into the discharge zone.

10 Claims, No Drawings

PRODUCTION OF NITRIC OXIDES

FIELD OF THE INVENTION

A novel device and method for the production of nitric acid and fertilizers based on same. The process is based on the use of an electric discharge through air enriched with a seeding material, preferably nitric oxide (NO). Advantageously means are provided for stabilizing the discharge. The system is a mobile one.

BACKGROUND OF THE INVENTION

Developments relating to the production of nitric oxides based on the use of electrical discharge were carried out at the beginning of the present century before the invention of the well known Haber process. Fertilizers were produced based on the electric discharge at locations where inexpensive hydro-electric power was available.

The Birkeland and Eyde process constitutes an improvement on the earlier processes. Birkeland applied a magnetic field in order to stabilize the A.C. arc discharge.

U.S. Pat. No. 829,874, issued in 1906 relates to the production of forming nitrogen compounds, and the improvement of this invention is in the use of air enriched with oxygen which is introduced into the electric arc.

U.S. Pat. No. 873,891 patented in 1907 relates to the production of nitric acid or nitric oxide and the improvement of this invention is in the rapid quenching of the product coming from the arc.

U.S. Pat. No. 926,413, patented in 1909 relates to a process wherein atmospheric nitrogen is oxidized by passing compressed air in two opposite streams through an electrical arc.

U.S. Pat. No. 3,666,408, patented in 1971 relates to the production of nitrogen oxides by reacting a nitrogen plasma and an oxygen plasma.

U.S. Pat. No. 3,623,265 relates to the production of nitrogen oxides by establishing electric arcs between electrodes and the earth, forming the desired products from oxygen and nitrogen in the air.

U.S. Pat. No. 4,010,897, patented in 1977 relates to a device for the production of nitrogen fertilizers for home use. It is based on the use of an electric arc discharge which ionizes oxygen and nitrogen, which products are injected into water used for application to plants.

None of the known processes make use of seeding material to substantially increase the efficiency of the process and none provide a truly mobile system which makes possible the production of the fertilizers at any desired location.

About 1910 the Haber process was developed for the production of ammonia. This process is based on the use of air, water and fossil fuel as energy and hydrogen source, and this process is effected at high pressures which require special apparatus.

Due to the substantially increased costs of fossil fuels, the process based on an electric discharge is of interest.

SUMMARY OF THE INVENTION

According to the present invention there is provided a novel improved process for the production of nitric oxides, and to a mobile device for carrying out such process. The improved process is characterized in that NO (nitric oxide) is added to "seed" the space in which the electrical discharge is effected, substantially improving the economics of the process.

As a consequence of the electric discharge through air, the nitrogen and the oxygen are ionized, the charged particles are accelerated by the electric and magnetic fields resulting in heating excitation and dissociation of molecules. In the "after discharge" region of the discharge zone there takes place a recombination resulting in the formation of nitric oxide.

Various types of electric discharges can be used: there can be used discharges of the arc type wherein the gases are heated to high temperatures and where the nitric oxide is formed by such process. There may be used a glow discharge operating at low temperatures of the gas, and which also results in the formation of nitric oxide.

In the electric discharge there is mainly formed nitric oxide (NO), which is subsequently oxidized to $NO_2$ which can be reacted with water to form nitric acid, $HNO_3$, which can be the final product or which can be used for the production of nitrogeneous type fertilizers.

It is known from the field of magnetohydrodynamics that the addition of small quantities of "seeds", i.e. gases with a low ionization potential, results in an increase of the ionization and concentration of the charged particles of the plasma, decreasing the voltage drop. Such "seeding" by nitric oxide, of the gaseous medium which is undergoing conversion to form nitric oxide has not been used hitherto.

According to the present invention, the electrical discharge is effected in a seeded gaseous medium, resulting in a substantial increase of the economics of the process. The seeding produces a marked increase of the collision rate of the charged moieties with the gas molecules, increasing the degree of excitation, heating and dissociation of the gas molecules, increasing the yield of nitric oxide. The seeding furthermore decreases the voltage drop of the discharge and thus decreases energy consumption of the process.

The main effect is that of an increased rate of dissociation, excitation and reaction of the molecules of oxygen and nitrogen present in the plasma. The ionization potential of molecular and atomic oxygen and nitrogen is higher by several electron volts than that of nitric oxide.

In order to "seed" the plasma in the electric discharge, "seeds" are introduced. It has been found that advantageous results can be obtained if a small part of the nitric oxide produced is recycled to the discharge space, increasing the degree of ionization dissociation in the plasma and decreasing the voltage drop of the discharge. In the discharge zone proper the main reaction seems to be one of dissociation, excitation and reaction of the gaseous molecules, while the nitric oxide is mainly formed after the discharge zone.

It is a further problem of the discharge reaction, that there exist problems of stabilization of the electrical discharge. When the discharge pressure is increased while a constant current is being maintained, when current is increased at a constant pressure, or when both are increased, a certain degree of instability of the discharge takes place, resulting ultimately in a constriction of said discharge. Such constriction results in the formation of regions termed "filaments" or "streamers" and is harmful to the desired reaction. Conventionally such discharges are stabilized by resorting to a suitable resisr impedance in series with the discharge, which fulfills the criterion that a discharge is stabilized when the negative slope of the current-voltage characteristic (V-I) of the resistor impedance exceeds that of the discharge characteristics at the point of intersection. With the conventional stabilization arrangement of the electric discharge, a substantial part of the power supplied is wasted on the ballast resistor.

According to a preferred embodiment of the present invention, the discharge is arranged in series with appliances required in the production process, such as the electrical motors of compressors and/or the electrical motors of pumps used to supply air and/or water to the system. This substantially increase the overall efficiency of the process.

The system according to the present invention comprises, in combination, pumps and compressors for the supply of air and of water, the discharge system and an absorption tower. The energy is supplied as electrical energy and the required raw materials are air and water which are available everywhere.

According to a preferred embodiment of the present invention, the device according to the present invention is provided as mobile unit, which can be set up at, or in the vicinity of, the place where the fertilizer is required. This makes possible to produce nitric acid and fertilizers close to the location of use, ultimate use. This decentralization of the production is of considerable commercial importance, as costs of transportation distribution and storage are saved to a large extent.

The increase of the overall efficiency of the process by the introduction of "seeds" (i.e. mainly recycling of some of the nitric oxide produced and by using the stabilization technique defined above) is of the order of about 15-35% compared with a process without use of such improvements.

The nitric oxide is produced mainly after the discharge zone, and thus the seeding of the discharge zone proper results in the desired improved performance of the process, increasing the yield of the nitric oxide produced.

The invention is illustrated with reference to the following Example, which is to be construed in a non-limitative manner.

EXAMPLE

A flow of air was maintained through a tube of 6 cm length and 2 cm diameter with a constriction of 30 mm length and 3.5 mm diameter at the middle of the tube, the pressure of air entering the tube being 100 torr. A DC discharge was maintained at a current of 0.2 A. The limiting energy yield for nitric oxide formed by the total discharge power was less than 0.55 mole/KWhr. The steady state concentration of the nitric oxide (NO) produced by the discharge was about 6 percent.

About 5 percent of the mixture leaving the discharge tube was reintroduced into the discharge tube at its entrance, and thus this passed again through the discharge plasma with air introduced. An increase of about 10-20 percent of yield was obtained by this seeding with nitric oxide.

It has been found that a few tenths percent of low ionization potential gas as "seeding material" introduced into the discharge zone together with the air entering this zone, results in substantial improvements of the performance of the process. The seeding material of choice is nitric oxide produced by the process, which is recycled to the discharge zone. This "seeding" by reintroduction of part of the product of the reaction increases the overall yield and/or decreases the voltage drop and/or makes it possible to run the discharge at a higher rate of flow of the gas.

I claim:

1. A process for the production of nitric oxides which comprises establishing an electrical discharge, passing through such discharge a mixture consisting essentially of air and a seeding amount of nitric oxide as seeding material, and recovering the produced nitric oxides.

2. A process according to claim 1, wherein the seeding material used is a small part of the produced nitric oxide which is recycled to the discharge area.

3. A process according to claim 1, wherein the seeding material is is obtained from an extraneous source.

4. A process according to claim 1, wherein the seeding material is formed from a mixture of oxygen/nitrogen compounds.

5. A process according to claim 1, wherein the process is performed in a plurality of discharges, arranged in series and/or in parallel, and a small part of the product is recycled to one or more of the preceding stages.

6. A system for the production of nitric oxide from air by electrical discharge, comprising in combination at least one discharge device, means for supplying air, means for supplying electricity and means for introducing a seeding amount of nitric oxide as seeding material to the discharge zone.

7. A system according to claim 6, wherein said means for supplying air includes an electrical motor driven pump or compressor and wherein the electrical motor of said pump or compressor is arranged electrically in series with said discharge means.

8. A system for the production of nitric oxides according to claim 6, in the form of a portable mobile device.

9. A process in accordance with claim 1, wherein said seeding material is present in an amount of about a few tenths of a percent of the air entering the discharge.

10. A process in accordance with claim 2, wherein about 5 percent of the mixture leaving the discharge is recycled to the discharge area.

* * * * *

UNITED STATES PATENT AND TRADEMARK OFFICE
CERTIFICATE OF CORRECTION

PATENT NO. : 4,287,040
DATED : September 1, 1981
INVENTOR(S) : Moshe ALAMARO

It is certified that error appears in the above-identified patent and that said Letters Patent are hereby corrected as shown below:

Delete the assignee shown as "[73] Assignee: G.D. Societa per Azioni, Bologna, Italy" and insert —[73] Assignee: none —

*Signed and Sealed this*

*Twenty-sixth* Day of *January 1982*

[SEAL]

*Attest:*

GERALD J. MOSSINGHOFF

*Attesting Officer*   *Commissioner of Patents and Trademarks*